(12) United States Patent
Balachandran et al.

(10) Patent No.: US 6,309,612 B1
(45) Date of Patent: Oct. 30, 2001

(54) CERAMIC MEMBRANE REACTOR WITH TWO REACTANT GASES AT DIFFERENT PRESSURES

(75) Inventors: Uthamalingam Balachandran, Hinsdale; Rodney L. Mieville, Glen Ellyn, both of IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/195,161

(22) Filed: Nov. 18, 1998

(51) Int. Cl.$^7$ ...................................................... C01B 3/00

(52) U.S. Cl. .................... 422/222; 95/45; 95/54; 422/239

(58) Field of Search ................................ 422/239, 211, 422/196, 222; 95/45, 54; 96/4

(56) References Cited

U.S. PATENT DOCUMENTS

| | | | |
|---|---|---|---|
| 4,791,079 | * 12/1988 | Hazbun | 502/4 |
| 5,032,365 | * 7/1991 | Aono et al. | 422/197 |
| 5,356,728 | * 10/1994 | Balachandran et al. | 429/8 |
| 5,580,497 | 12/1996 | Balachandran | 252/519.1 |
| 5,599,510 | * 2/1997 | Kaminsky et al. | 422/197 |
| 5,639,437 | 6/1997 | Balachandran | 423/593 |

* cited by examiner

Primary Examiner—Marian C. Knode
Assistant Examiner—Frederick Varcoe
(74) Attorney, Agent, or Firm—Joy Alwan; Thomas G. Anderson; Virginia B. Caress

(57) ABSTRACT

The invention is a ceramic membrane reactor for syngas production having a reaction chamber, an inlet in the reactor for natural gas intake, a plurality of oxygen permeating ceramic slabs inside the reaction chamber with each slab having a plurality of passages paralleling the gas flow for transporting air through the reaction chamber, a manifold affixed to one end of the reaction chamber for intake of air connected to the slabs, a second manifold affixed to the reactor for removing the oxygen depleted air, and an outlet in the reaction chamber for removing syngas.

14 Claims, 4 Drawing Sheets

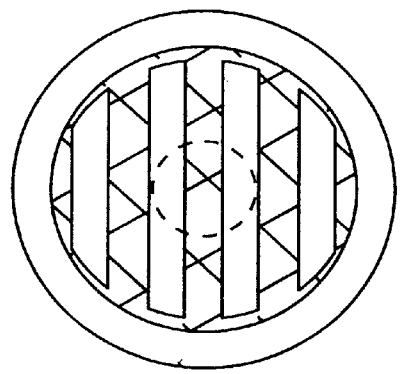
FIG. 2D
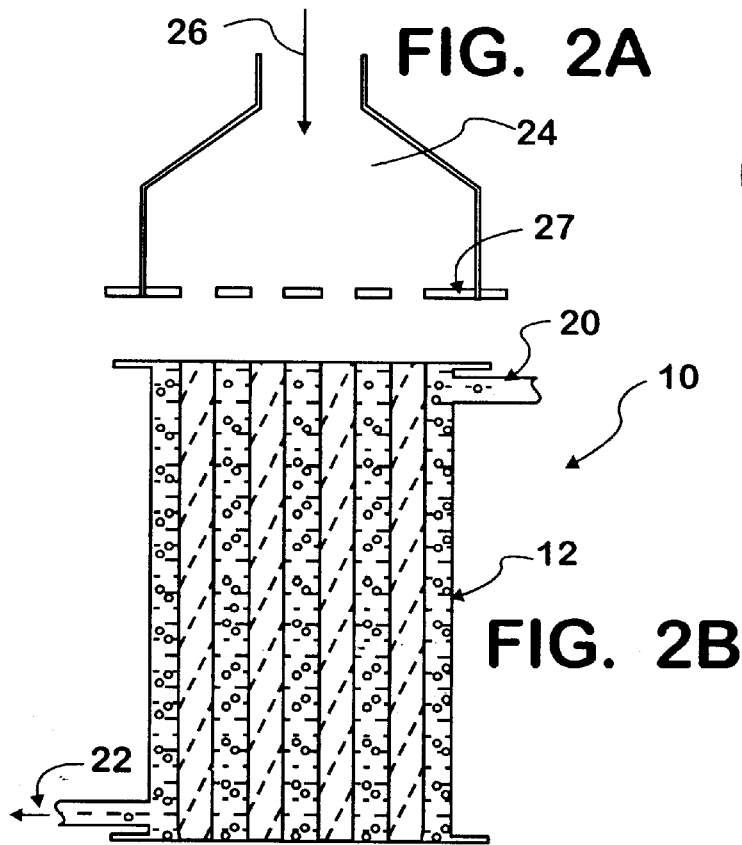
FIG. 2A
FIG. 2B
FIG. 2C
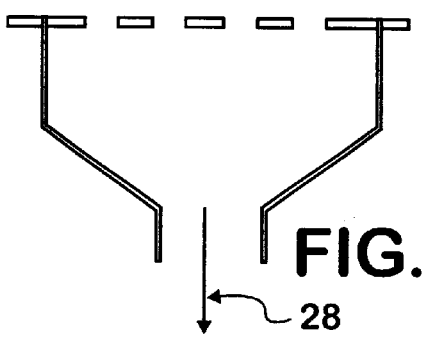 O2 PERMEATING CERAMIC
HIGH PRESSURE METHANE

CERAMIC MEMBRANE REACTOR WITH TWO REACTANT GASES AT DIFFERENT PRESSURES

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory

BACKGROUND OF THE INVENTION

1. Field of the Invention

The invention relates to a ceramic membrane reactor for contacting two reactant gases at different pressures when separated by an oxygen permeable membrane to produce syngas.

2. Background of the Invention

There is considerable interest in converting natural gas, which is mainly methane, into syngas (CO and $H_2$) which can be further converted into liquid fuels or other valuable chemicals. One process involves reacting oxygen from an oxygen containing gas stream with a hydrocarbon compound in another gas stream without diluting the hydrocarbon or products of oxidation with other gases from the oxygen containing gas stream such as nitrogen from an air stream.

The partial oxidation of natural gas to produce syngas requires an oxygen plant which makes the cost prohibitive in most situations. One way around this is to use a ceramic oxygen separating membrane which will allow atmospheric oxygen to permeate through the membrane while excluding other gases. In a syngas plant, a reactor made of this ceramic material would transport oxygen from the side in contact with atmospheric air to the other side in contact with the natural gas.

Natural gas, as it comes from the well head is at considerable pressure, i.e. around 500–1500 psi. Since ceramic membranes can fracture under pressure, it is necessary to either offset the high pressure gas on one side of the membrane with high pressure air on the other side of the membrane or to reduce the pressure of the gas to match the pressure of the air in order to prevent membrane failure. When the ceramic membrane is subjected to a compressive pressure, i.e. an external force, then the membrane maintains its integrity. High pressure air requires an expensive air compressor which negates the advantage of operating without a cryogenic oxygen separation plant. Depressurizing the natural gas would be a disadvantage since after the syngas is produced it would have to be repressurized for further processing to value added products.

SUMMARY OF THE INVENTION

It is an object of the present invention to provide a ceramic membrane reactor for the production of syngas which allows a differential pressure to exist in the reactor.

It is another object of the present invention to provide a ceramic membrane reactor in which the oxygen laden air travels parallel to the methane or natural gas.

It is another objective of the invention to provide a ceramic membrane reactor which minimizes the number of seals between the parts.

It is another object of the invention to reduce the stress on the individual ceramic slabs.

Briefly, the invention is a ceramic membrane reactor for syngas production having a reaction chamber, an inlet in the reaction chamber for natural gas intake, a plurality of oxygen permeating ceramic slabs inside the reaction chamber with each slab having a plurality of passages paralleling the gas flow for transporting air through the reaction chamber, a manifold affixed to one end of the reaction chamber for intake of air connected to the slabs, a second manifold affixed to an opposing end of the reactor for removing the oxygen depleted air, and an outlet in the reaction chamber for removing syngas.

BRIEF DESCRIPTION OF THE DRAWINGS

These and other objects and advantages of the present invention will become readily apparent upon consideration of the following detailed description and attached drawings, wherein:

FIG. 2a is a cross sectional side view of the reactor and manifolds.

FIG. 2b is a cross sectional plan view of the manifold.

FIG. 2c is a cross sectional side view of the outlet manifold.

FIG. 2d is a top plan view of the reactor.

DETAILED DESCRIPTION OF THE INVENTION

Figure 1A:
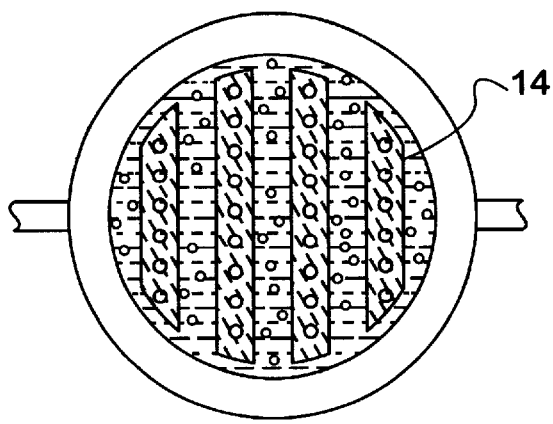
FIG. 1a is a top plan view of the reactor.
Figure 1B:
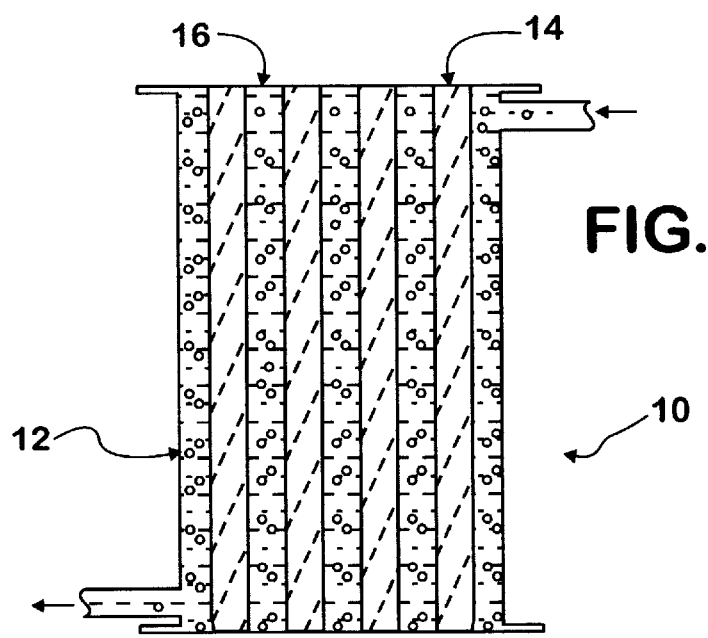
FIG. 1b is a cross sectional side view of the reactor.
Figure 1C:
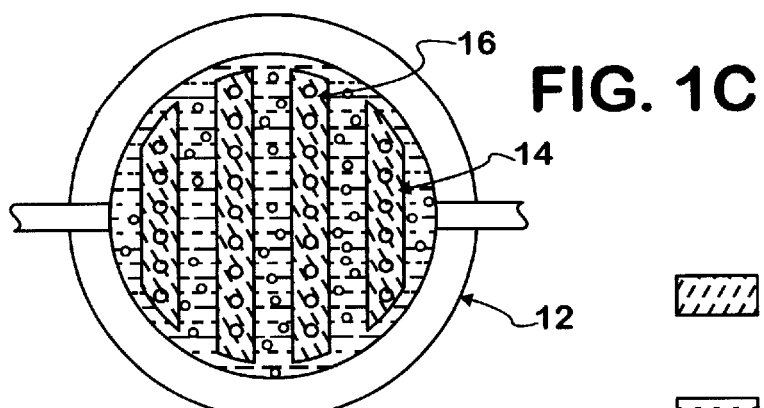
FIG. 1c is a bottom plan view of the reactor.
Figure 3A:
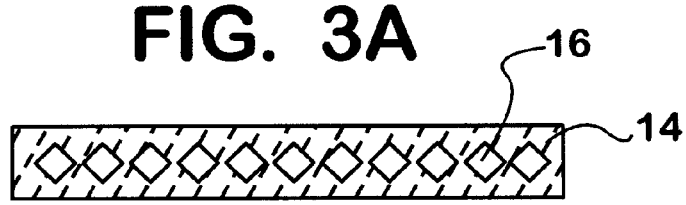
FIG. 3a is a plan view of the reenforced end of a ceramic slab.
Figure 3B:
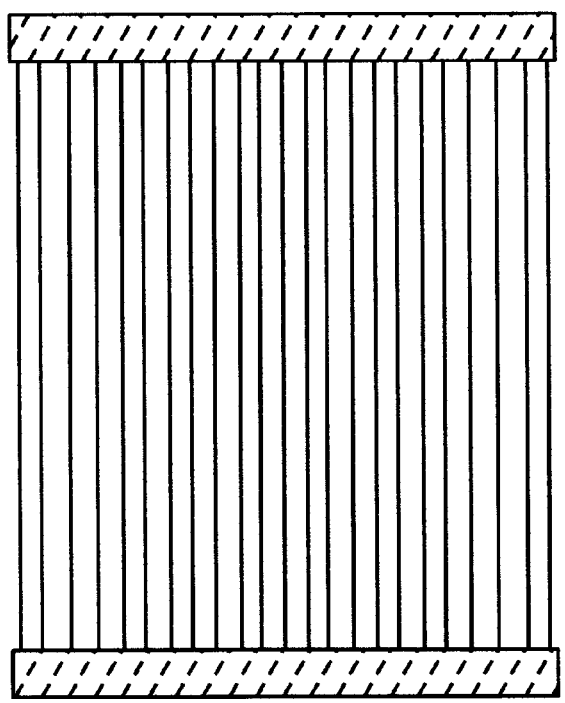
FIG. 3b is a side view of a ceramic slab.
Figure 3C:
FIG. 3c is a plan cross sectional view taken from the center of the ceramic slab.

This invention is a ceramic membrane reactor which allows a differential pressure to exist across the reactor. In contrast to conventional fuel cells, ceramic dual conductor membrane cells are not designed to complete an external electrical circuit. FIGS. 1a–c illustrate the reactor 10. The reactor is encased in an external shell 12 comprised of material capable of containing high pressure gas from a downstream operation. The pressure range is from approximately 14.4 to 1000 psi. In the preferred embodiment, the shell 12 is made of steel and the pressure is approximately 500 psi. The reactor design allows the pressurized gas or methane to enter the main reaction chamber where it is confined by an outside steel wall and compresses only on the exterior of the ceramic membrane in order to minimize interior stresses in the membrane caused by the high pressure. The temperature range for operation would be in the range of 650–950° C. The membrane consists of oxygen permeating ceramic slabs 14 containing a plurality of longitudinally parallel air ducts 16 which are placed in the reactor 10. The air ducts are open at each end of the slab. The number of slabs would be dependent on the size of the reactor, the size of the individual slabs and the oxygen conductivity of the slab material.

Slabs are composed of dense ceramics which have electron conductivity and oxygen ion conductivity. A typical slab is composed of inorganic crystalline material comprising strontium, iron, cobalt and oxygen having a perovskite-like structure. Materials known as "perovskite" are a class of materials having an X-ray identifiable crystalline structure based on the structure of perovskite, $CaTiO_3$. In its idealized form, the perovoskite structure has a cubic lattice in which a unit cell contains metal ions at the corners of the cell, another metal ion in its center and oxygen ions at the midpoints of each cube edge. This cubic lattice is identified as an $ABO_3$-type structure where A and B represent metal ions. In the idealized form of perovskite structure, generally, it is required that the sum of the valences of A and B equal 6 as in $CaTiO_3$. Such a material is described in U.S. Pat. No. 5,639,437 to Balachandran et. al. which is hereby incorporated by reference.

In the structure of such a perovskite, the oxygen ions aline to form columns of oxygen ions through the crystal. It is believed that shifting the entire column by one lattice position would have the effect of transporting an oxygen from one end of the crystal to the other. Since these oxygens are in the form of oxygen ions, atmospheric oxygen could add to one end of the column and exit the opposite side only through an oxidation reduction reaction. This mechanism would explain the transport of oxygen while not transporting other molecules such as nitrogen.

The reactor 10 is designed to be one member of a series of reactors run in a parallel configuration. A series of reactors run in parallel would minimize the effects of breakdowns and increase the ease of repair. It would also increase the safety of operation by allowing explosive or incendiary events to be localized. Parallel modular reactors would also minimize constrictions in the air path which would reduce pressure build-up and allow for the use of air blowers.

In the first embodiment, the interior sides of the reactor shell 12 are grooved to hold the slabs 14. The ends of the slabs perpendicular to the air ducts are also thickened to reinforce the slabs. Alternatives to the ceramic slabs would be ceramic membrane tubes similar to tube bundle heat exchangers or a honeycomb monolith.

An important factor in the design of the reactor 10 is the seal between the reactor and the manifold 24, particularly the seal at the ceramic slab 14. In the first embodiment, a metal plate or gasket 26 is placed between the reactor 10 and manifold 24 with retaining bolts securing the seal. Thermal expansion of the ceramic slabs 14 is accommodated by sliding seals at the top of the reactor or manifold where temperatures would be closer to ambient. Compression stresses due to the thermal expansion and compression of the ceramic slabs 14 can be alleviated by a rod comprised of metal having a coefficient of expansion similar to the ceramic running the length of each slab.

High pressure natural gas or methane gas enters the reactor 10 at inlet 20. The gas flows along the spaces between the ceramic slabs 14. Reaction products exit the reactor at outlet 22. The manifold 24 is illustrated in FIG. 2. Air at atmospheric pressure from a blower (not shown) flows into the manifold inlet 26 on the top section of the manifold. The air is directed to the air ducts 16 in the ceramic slabs by means of a plate 27. The plate covers the spaces between the slabs thereby preventing the air from entering those spaces. Since the air flow is unidirectional with the high pressure natural gas or methane gas, the pressure drop down the reactor 10 is minimal at even high velocities requiring only a low cost blower as against an expensive compressor. High pressure natural gas surrounds each oxygen permeating ceramic slab 14. This subjects the ceramic slabs only to compressive forces induced by the high pressure natural gas and allows operation in a differential pressure mode.

Oxygen from air is extracted by the inner surface of the air ducts 16 of the ceramic slabs 14. The oxygen depleted air exits the manifold 24 at outlet 28. The extracted oxygen is transported across the slab 14 in the form of oxygen ions or molecular oxygen to the outer surface of the slab. At the outer surface of the slab, the oxygen ions are contacted with high pressure natural gas or methane gas to react oxidatively. The slabs are made according to the method of U.S. Pat. No. 5,573,737 incorporated by reference.

Catalysts can either be placed in the gaps between the slabs 14 or as a thin coating on the reaction side of the ceramic membrane or at the outlet 28 where products of the oxidation reaction and unreacted methane can react rapidly to establish thermodynamic equilibrium. Any catalysts for processes making syngas from methane, ethane, and other light hydrocarbons may be used with this invention. These catalysis include but are not limited to rhodium, palladium, platinum, iridium, or ruthenium on alumina; nickel on alumina; and certain transition metal oxides including $Pr_2Ru_2O_7$ and $Eu_2Ir_2)_7$.

Figure 4:
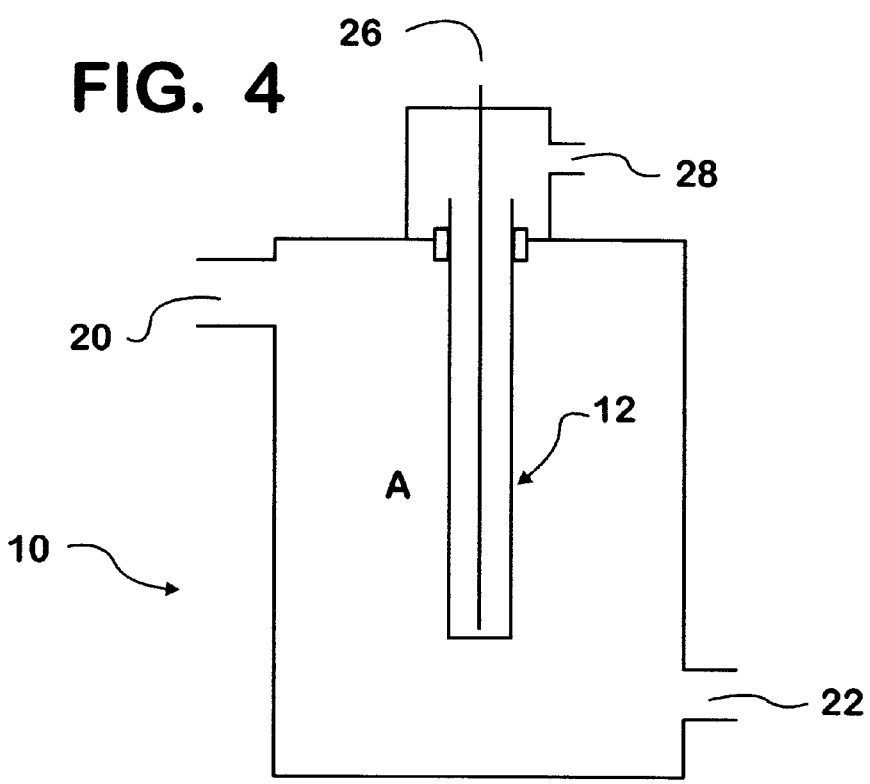
FIG. 4 is a diagram of second embodiment of the reactor.

FIG. 4 illustrates the second embodiment having the ceramic slab membrane 14 and the air intake plate 26 made as a single piece. The metal hood 24 of the inlet manifold is attached to the ceramic slab and seal by means of a bolt system. Expansion stresses can be alleviated by spring washers (not shown) at each bolt. This configuration allows the seal to be confined to the perimeter of the reactor 10.

Figure 5:
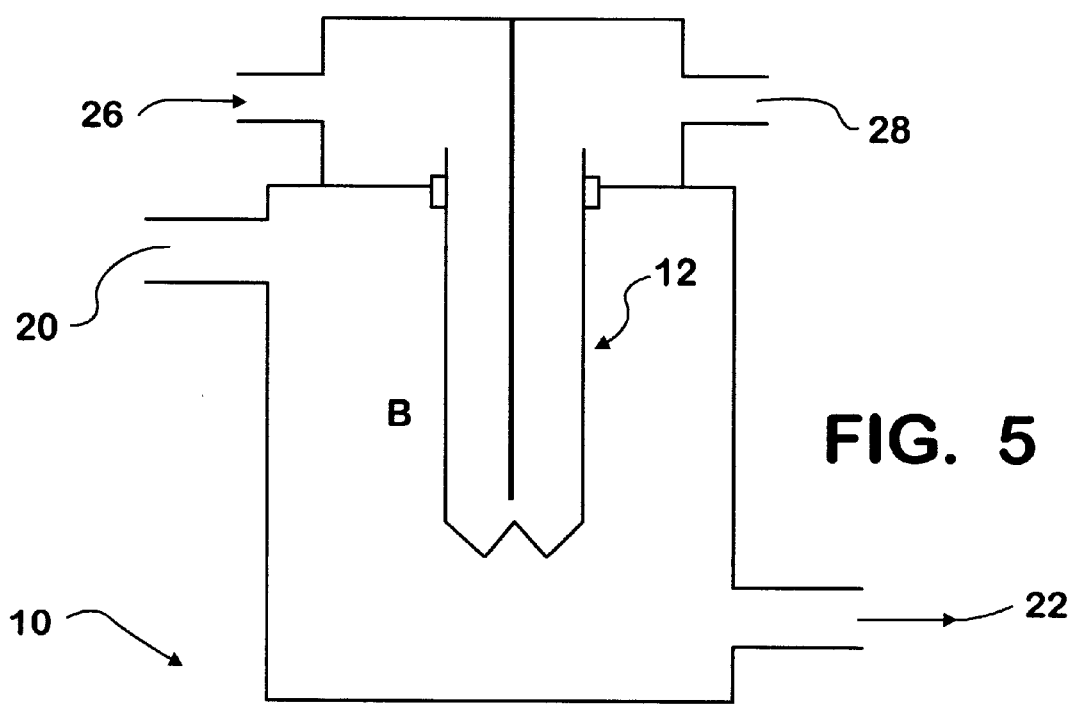
FIG. 5 is a diagram of a third embodiment of the reactor.

FIG. 5 shows a third embodiment where the ceramic slabs 14 is are a series of U-shaped sections suspended in the reactor 10. The slabs are suspended from plate and seal assembly 26. High pressure natural gas enters the reactor at inlet 20 and reaction products exit at outlet 22. The air outlet manifold 28 is contained within the air intake manifold 24. Inlet air is directed into the air ducts 16 of the ceramic slab 14. Air moves through the air ducts and is removed from the center of the reactor by gasket assembly 26 connected to air outlet manifold 28. Separation of the inlet and outlet air streams does not have to be leak tight. This system accommodates all expansion stresses by being anchored at one end only. This system can utilize a metal gasket manifold or a one piece ceramic manifold and reactor.

FIG. 6 shows an experimental reactor used for laboratory testing. The slab 12 was a tubular ceramic membrane composed of $SrCo_{0.5}FeO_x$. having a 0.6 cm diameter, 4 cm length, and 0.1 cm wall thickness. The surface area was 7.4 $cm^2$. Air was blown through the slab at a rate of 300 cc/min and a mix on 90 mol % Argon and 10 mol % Methane flowed over the surface of the slab at a rate of 300 cc/min. The test run was at atmospheric pressure and a temperature of 910° C. After 72 hours, 95% of the methane had reacted. CO and $H_2$ composed 98% of the product.

While the invention has been described with reference to details of the illustrated embodiment, these details are not intended to limit the scope of the invention as defined in the appended claims.

The embodiment of the invention in which an exclusive property or privilege is claimed is defined as follows:

1. A ceramic membrane reactor for syngas production comprising:

a reaction chamber;

an inlet in the reaction chamber for natural gas intake;

a plurality of oxygen permeating u-shaped ceramic membrane slabs inside the reaction chamber;

each slab having a plurality of passages for transporting air through the reaction chamber;

a first manifold affixed to the reaction chamber for intake of air connected to an entrance of the slab passages;

a second manifold affixed to the reactor for removing the oxygen depleted air, the second manifold connected an exit of the slab passages; and an outlet in the reaction chamber for removing syngas.

2. The reactor of claim 1 wherein the natural gas pressure is in a range of approximately 14.7 to 1000 psi.

3. The reactor of claim 1 wherein the air is at atmospheric pressure.

4. The reactor of claim 1 wherein the slabs are composed of a dense ceramic comprising a crystalline mixed metal oxide exhibiting the ability to separate oxygen from a gaseous mixture and transport the oxygen through the membrane.

5. The reactor of claim 1 wherein the second manifold for removing the oxygen depleted air is suspended within the first manifold for air intake.

6. The reactor of claim 1 wherein the ceramic slabs are attached to the first manifold for air intake and second manifold for air outlet.

7. The reactor of claim 1 wherein the ceramic slabs are suspended from the first manifold for air intake.

8. A ceramic membrane reactor for syngas production comprising:

a reaction chamber;

an inlet in the reaction chamber for natural gas in a pressure range of approximately 14.7 to 1000 psi;

a plurality of oxygen permeating u-shaped ceramic membrane slabs inside the reaction chamber;

each slab having a plurality of passages for transporting air through the reaction chamber;

a first manifold affixed to the reaction chamber for intake of atmospheric air connected to an entrance to the slab passages;

a second manifold affixed to the reactor for removing the oxygen depleted air, the second manifold connected an exit of the slab passengers; and an outlet in the reaction chamber for removing syngas.

9. The reactor of claim 8 wherein the slabs are composed of a dense ceramic comprising a crystalline mixed metal oxide exhibiting the ability to separate oxygen from a gaseous mixture and transport the oxygen through the membrane.

10. The reactor of claim 8 wherein the second manifold for removing the oxygen depleted air is suspended within the first manifold for air intake.

11. The reactor of claim 8 wherein the ceramic slabs are attached to the first manifold for air intake and second manifold for air outlet.

12. The reactor of claim 8 wherein the ceramic slabs are suspended from the first manifold for air intake.

13. A ceramic membrane reactor for syngas production comprising:

a reaction chamber;

an inlet in the reaction chamber for natural gas in a pressure range of approximately 14.7 to 1000 psi;

a plurality of oxygen permeating unshaped ceramic membrane slabs inside the reaction chamber, said slabs composed of a dense ceramic comprising a crystalline mixed metal oxide exhibiting the ability to separate oxygen from a gaseous mixture and transport the oxygen through the membrane;

each slab having a plurality of passages for transporting air through the reaction chamber;

a first manifold affixed to one end of the reaction chamber for intake of atmospheric air connected to the slabs;

a second manifold affixed to the reactor for removing the oxygen depleted air; and an outlet in the reaction chamber for removing syngas.

14. The reactor of claim 13 wherein the second manifold for removing the oxygen depleted air is suspended within the first manifold for air intake.

* * * * *